(12) United States Patent
Derrick et al.

(10) Patent No.: US 8,911,195 B2
(45) Date of Patent: Dec. 16, 2014

(54) TAIL HAULER

(75) Inventors: Matthew Marvin Derrick, South Bend, IN (US); Stephen Edward Gerencser, South Bend, IN (US)

(73) Assignee: VisibleElectronics, Inc., South Bend, IN (US)

( * ) Notice: Subject to any disclaimer, the term of this patent is extended or adjusted under 35 U.S.C. 154(b) by 236 days.

(21) Appl. No.: 13/315,883

(22) Filed: Dec. 9, 2011

(65) Prior Publication Data
US 2013/0149083 A1 Jun. 13, 2013

(51) Int. Cl.
*B60P 9/00* (2006.01)
*B60P 3/12* (2006.01)
*B60P 3/07* (2006.01)
*B60P 3/06* (2006.01)

(52) U.S. Cl.
CPC . *B60P 3/122* (2013.01); *B60P 3/06* (2013.01); *B60P 3/07* (2013.01)
USPC .............................. 414/462; 414/495; 414/540

(58) Field of Classification Search
USPC .................. 414/462–466, 495, 540, 545, 921
See application file for complete search history.

(56) References Cited

U.S. PATENT DOCUMENTS

| | | | | |
|---|---|---|---|---|
| 3,754,672 A | * | 8/1973 | Blomquist et al. | 414/462 |
| 5,567,107 A | * | 10/1996 | Bruno et al. | 414/462 |
| 5,752,798 A | | 5/1998 | Smidler | |
| 5,772,388 A | | 6/1998 | Clark | |
| 5,816,763 A | * | 10/1998 | Hamann et al. | 414/462 |
| 5,975,495 A | * | 11/1999 | Berends et al. | 254/2 B |
| 6,007,290 A | * | 12/1999 | Schulz et al. | 414/462 |
| 6,077,024 A | * | 6/2000 | Trueblood | 414/462 |
| 6,409,153 B1 | * | 6/2002 | Norris | 254/93 R |
| 6,461,096 B1 | | 10/2002 | Menetel et al. | |
| 6,579,055 B1 | * | 6/2003 | Williams | 414/462 |
| 6,698,995 B1 | * | 3/2004 | Bik et al. | 414/462 |
| 6,884,018 B1 | * | 4/2005 | Dugan et al. | 414/462 |
| RE39,646 E | * | 5/2007 | Dehl | 414/462 |
| 2006/0280584 A1 | * | 12/2006 | Spuzak et al. | 414/462 |
| 2008/0206030 A1 | * | 8/2008 | Reuille et al. | 414/462 |
| 2009/0025154 A1 | | 1/2009 | Smith | |
| 2010/0135756 A1 | * | 6/2010 | Winter, IV | 414/462 |

OTHER PUBLICATIONS

International Search Report and Written Opinion mailed Feb. 8, 2013 in PCT/US2012/067577.

* cited by examiner

*Primary Examiner* — Gregory Adams
*Assistant Examiner* — Lynn Schwenning
(74) *Attorney, Agent, or Firm* — Davidson Berquist Jackson & Gowdey LLP (57) ABSTRACT

A lifting assembly for use on vehicles of a variety of types, including recreational vehicles, vans, trucks and the like, and includes one or more lifting structures that will support a deck structure. The lifting assembly will be removably mounted to the vehicle frame so that the whole assembly can be removed from the vehicle, and the deck structure is pivotally mounted to the lift assembly so that it can be moved between a stored position when not in use, or a transport position when loads are to be carried. When in the transport position the deck will be movable between lowered and raised positions so that items can be placed on the deck in the lowered position and then transported once the deck is raised to a desired height.

18 Claims, 13 Drawing Sheets

FIG. 12

TAIL HAULER

COPYRIGHT NOTICE

A portion of the disclosure of this patent document may contain material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This disclosure relates to a device for attachment to the rear of a vehicle, for example, a van, a truck, camper or an RV, and includes a fold down deck support and a lifting mechanism that will support and lift an item to be carried to a suitable height for transport thereby allowing use of a standard tow bar.

INTRODUCTION

Glossary: As used throughout this document:

The phrase "lifting assembly" shall mean a mechanism having one or more incrementally movable lifting structures on which a deck or other support device is attached.

The terms "deck" and "support platform" shall include a floor or platform which is attached to a lifting assembly so as to be movable between a lifting position and a storage position, and when in the lifting position can be raised or lowered between a plurality of incremental positions.

DESCRIPTION OF PRESENTLY PREFERRED EXAMPLES OF THE INVENTION

Brief Description of Figures

The invention can be better understood by reading the following detailed description with reference to the accompanying drawings in which.

DESCRIPTION

A. Overview

To gain a better understanding of the invention, a preferred embodiment will now be described in detail. Frequent reference will be made to the drawings. Reference numerals or letters will be used throughout to indicate certain parts or locations in the drawings. The same reference numerals or letters will be used to indicate the same parts and locations throughout the drawings, unless otherwise indicated.

B. Environment

The preferred embodiment now described will be with respect to a golf cart as the item to be lifted and hauled by an RV on which the mechanism has been installed for use. The scale of the embodiment, therefore, is to be understood with respect to these types of articles. It is to be understood as well, however, that the invention is applicable to other articles, both larger and smaller, and its scale can, therefore, vary accordingly.

C. Structure

Figure 1:
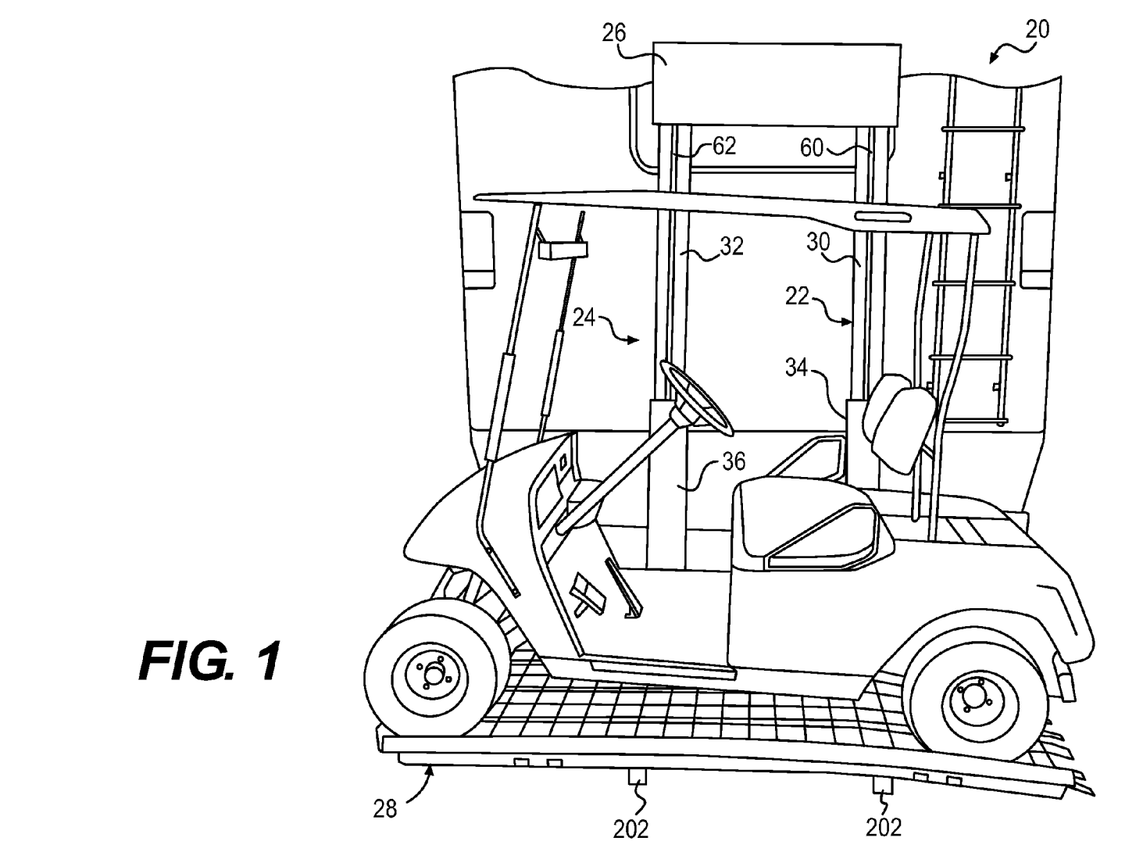
FIG. 1 is an elevational view from the rear of the hauling mechanism with a golf cart positioned thereon prior to being raised to a transport height.

FIG. 1 shows a rear view of a recreational vehicle (RV) 10 on which a hauling and lifting mechanism 20 has been installed. As shown a golf cart has been driven onto a deck 28 that is supported by lifting mechanism 20. In this view the lifting mechanism 20 has been fully lowered and deck 28 is adjacent or actually touching the ground. Once the golf cart is in place and secured on deck 28, for example by clamps, ropes, chains, stretchable cords or other suitable devices, lifting mechanism 20 will be raised thereby lifting deck 28 to a higher transport position as shown, for example, in FIG. 8. While a golf cart is shown on deck 28 it should be understood that deck 28 can carry any load that a vehicle owner might wish to transport, including, for example, camping equipment, food, chairs, bicycles, boats or other recreational or household items.

Figures 2A, 2B:
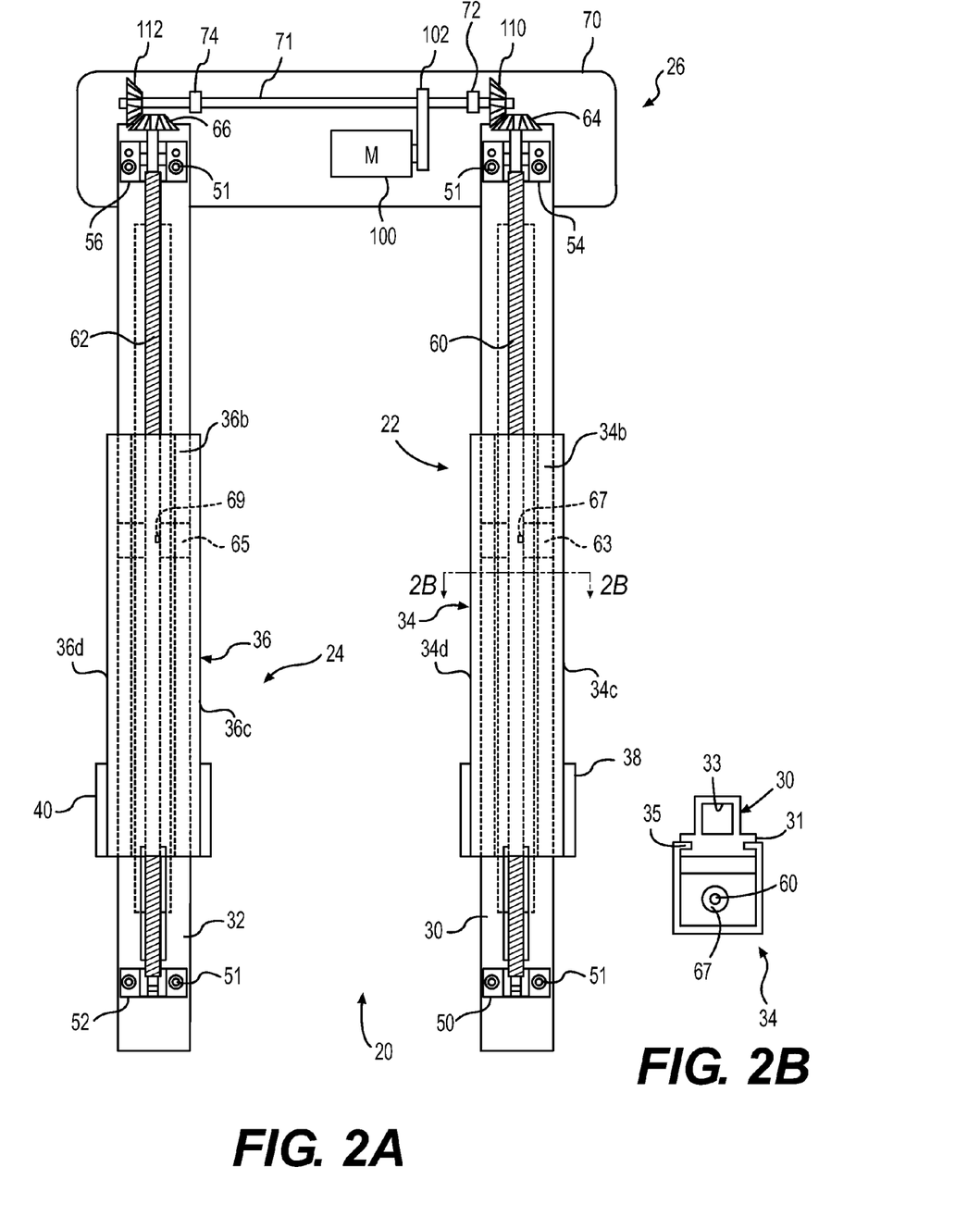
FIG. 2A is a front elevational view of the lifting mechanism of FIG. 1.
FIG. 2B is a cross-sectional view taken along line 2B-2B in FIG. 2A.

FIG. 2 shows the base parts of lifting mechanism 20 as including a right side vertical portion 22, as shown in FIG. 1, a left side vertical portion 24, and a horizontally extending upper portion 26. Each of the right and left side vertical portions 22 and 24 include a back rail 30 and 32, respectively, a movable carriage 34 and 36, respectively, and right and left hinge assemblies 38 and 40, respectively.

Each back rail 30/32 includes a bottom block 50/52 and a top block 54/56, respectively, mounted to the back rails 30/32, for example, by bolts 51. It should be understood that in lieu of bolts 51 other securing approaches, including other types of mechanical fasteners could be used, such a screws or rivets, or adhesives, including, for example, epoxy, or combinations of such attachment approaches depending upon the material being used, the load to be supported and other design constraints or desires. This applies equally to each of the items that are to be mounted to or on other items as identified throughout this description, unless specified otherwise herein. A threaded rod 60/62, respectively, is operatively and rotationally mounted between pairs of the top and bottom blocks 50/54 and 52/56, respectively, so as to be rotatable therein and there between within each of the right and left side portions 22/24. It should be understood that there may be other approaches to move carriages 34/36 up and down and thus the use of threaded rods 60/62 are exemplary.

Figure 4:
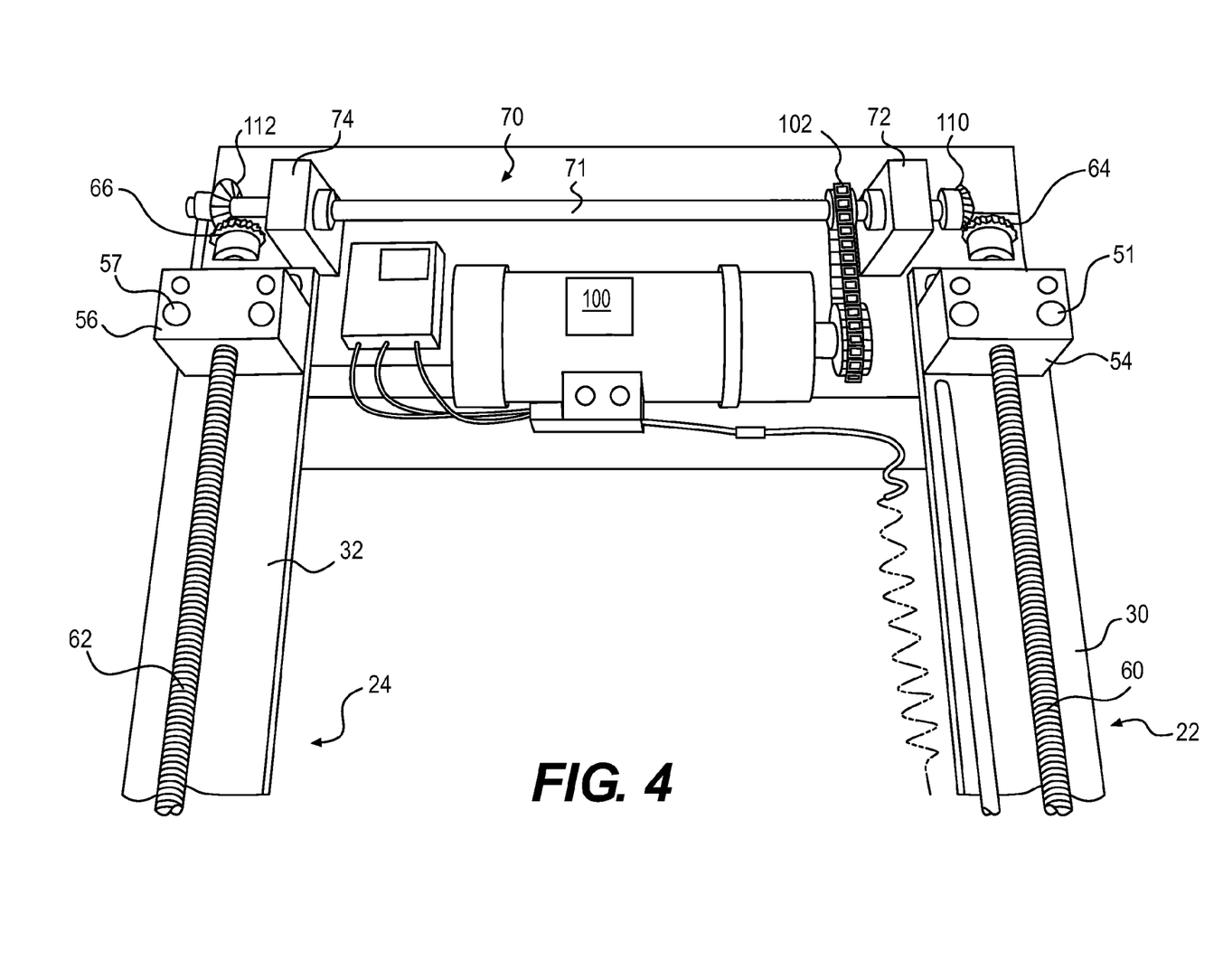
FIG. 4 is a front elevational view of the upper portion of the lifting mechanism and drive assembly.

The upper portion 26 includes a rear plate 70, which is itself mounted to an upper end of each of the back rails 30/32, again by bolts, screws or other mounting approaches as noted above. Two mounting bearing blocks 72 and 74 are separately attached to rear plate 70, for example by bolts or screws (not shown), as noted previously, that can enter through plate 70 from the back and then into blocks 72/74, at positions adjacent the ends of rear plate 70, but inboard of back rails 30/32. A drive bar 71 is rotatably mounted within bearing blocks 72/74 so as to extend horizontally across rear plate 70 and above the ends of threaded rods 60/62. A bevel gear 64/66 is provided at the upper end of each of the threaded rods 60/62, respectively, and can be secured thereto, for example, by set screws (not shown) and/or a locking pin (not shown). Likewise, a mating bevel gear 110 and 112 are each secured at opposite ends of drive bar 71, in a manner similar to that used for bevel gears 64/66. The two sets of bevel gears 64/110 and 66/112 are each respectively mounted so that they will mesh together and operatively engage.

A drive motor 100 is mounted in a conventional manner, for example by suitable brackets (not shown), to rear plate 70 and is operatively connected to drive bar 71, for example by a drive chain 102 and a gear 104 attached to drive bar 71. When motor 100 is running, it will rotate drive bar 71 in a one of a clockwise or counter-clockwise direction, depending upon whether the motor 100 is being directed to raise or lower carriages 34/36. As drive bar 71 is rotated, bevel gears 110/112 will mesh with and drive bevel gears 64/66, respectively, thereby rotating threaded rods 60/62, respectively.

Each of the two carriages 34/36 comprises an elongated, rectangular tube with an open or hollow interior 34a and 36a, respectively, with each having a front wall 34b and 36b, respectively, opposing side walls 34c and 34d, and 36c and 36d, respectively, and a rear wall comprised of opposing, inwardly directed and spaced apart flanges 34e and 34f, and 36e and 36f, respectively. Mounted within the hollow interior 34a/36a, respectively, and at a point midway or at least at a desired point between the top and bottom edges of each carriage 34 and 36, is travel block 63 and 65, respectively, mounted in place, for example by bolts, screws, or other attachment methods as mentioned previously.

Travel blocks 63/65 each have a threaded central aperture 67/69, respectively, that will mate with the threaded exterior of rods 60/62 whereby when rods 60/62 are rotated travel blocks 63/65 will be moved upwardly and downwardly on rods 60/62, carrying carriages 34/36 therewith, depending upon the rotational direction, clockwise or counterclockwise, in which rods 60/62 are driven.

Figure 3:
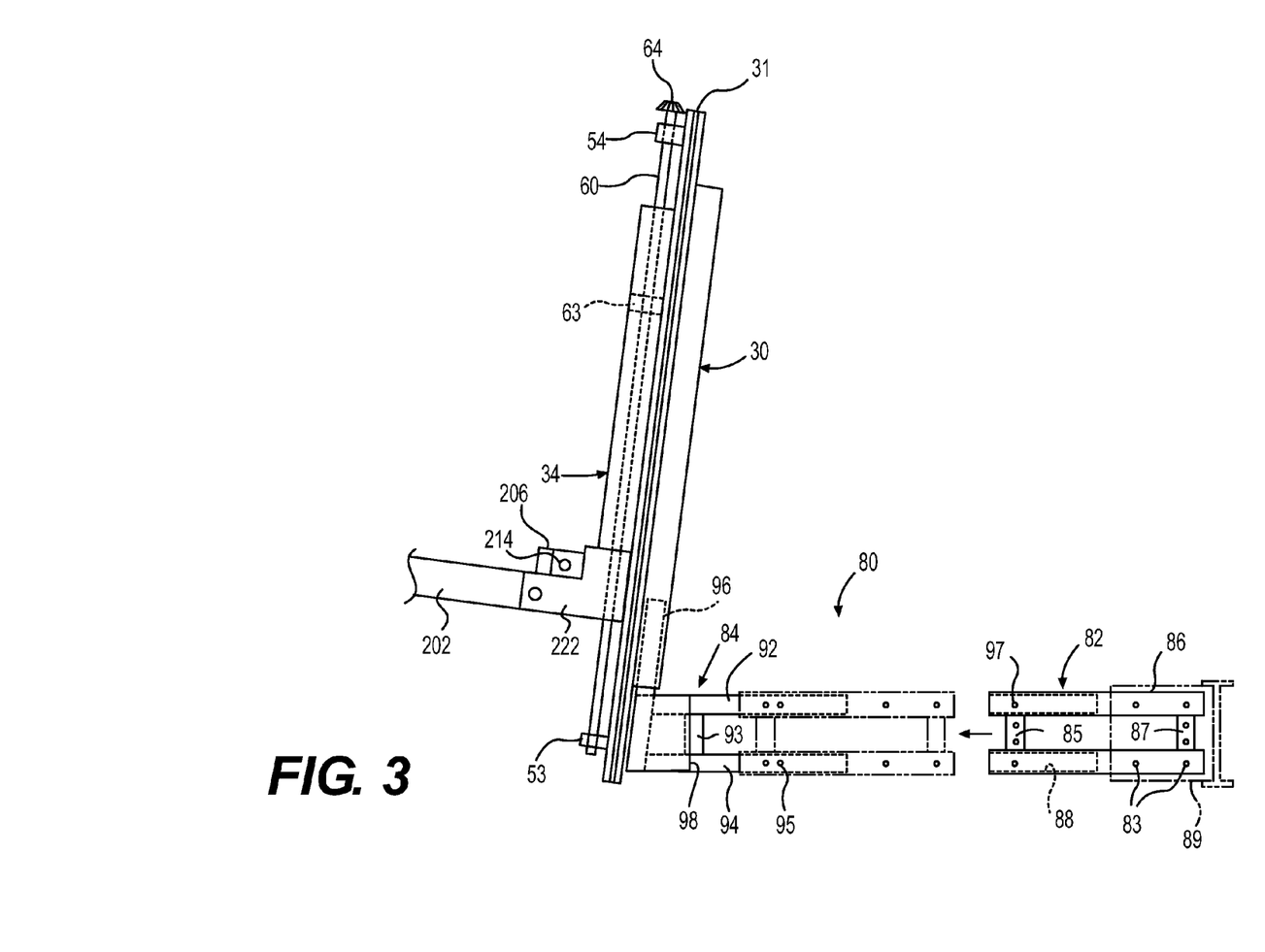
FIG. 3 is a side elevational view of the support mechanism of FIG. 1.

FIG. 3 shows the lifting mechanism 20 from the side as well as a mounting assembly 80 that includes a vehicle connection portion 82 and a lifting mechanism connection portion 84. It should be understood as well that two, spaced apart mounting assemblies 80 will be used, one for each of the back rails 30 and 32 of the lifting mechanism 20, and further that while only one will now be described hereinafter in detail, each mounting assembly 80 will have the same construction.

With this in mind, vehicle connection portion 82 includes spaced apart, upper and lower mounting bars 86 and 88, as well as front and rear coupling members 85 and 87. The exact design, spacing and dimensions of the mounting bars 86/88 can vary depending upon the configuration, shape and design of a particular vehicle's frame. Mounting bars 86/88 are mounted to the vehicle's frame, shown in phantom at 89, by any convenient approach including, for example, bolts 83. It should also be understood that bars 86/88 could be attached to vehicle frame 89 by straps, clamps, or other devices that could securely mount bars 86/88 onto frame 89. The bars 86/88 are also preferably hollow tubes with an open interior 90 that extends along at least approximately the front one third of their overall length. To provide a strong support structure, the dimensions of mounting bars 86/88 are about 24 inches, they are preferably formed from a metal, such as, for example steel, and the wall thicknesses defining the open interiors 90 are about one quarter of an inch in thickness.

The vehicle connection portion 84 is comprised of spaced apart, upper and lower support members 92 and 94. The front end of each support member 92/94 is preferably welded to a lower portion of a vertical mounting bar 96 and to a stabilizing plate 98 that could be provided on one or both sides of the vehicle connection portion 84. If desired the front end of vehicle connection portion 84 could also include a vertical reinforcing and spacing support member 93. The total length of the vertical mounting bar 96 is preferably about 17 inches, and the upper portion that extends above the top support member 92 is preferably about 8 inches. Also, bar 96 is also preferably positioned at a slight angle of about 6° from vertical relative to the support members 92/94. Support members 92/94 have an external shape and size that permits each to slide into a front portion of the hollow interior 90 of mounting bars 86/88. Support members 92/94 each also include at least one and preferably a plurality of apertures 95, while bars 86/88 each include a complementary set of apertures 97. As support members 92/94 are slid into the open interior 90 of mounting bars 86/88 the two sets of apertures 95/97 will come into alignment and a locking pin or pins can then be inserted therein to hold support members 92/94 in place, yet be removable. Bars 86/88 are preferably comprised of metal, for example, steel, and support members 92/94 are also preferably from metal such as steel.

Figure 8:
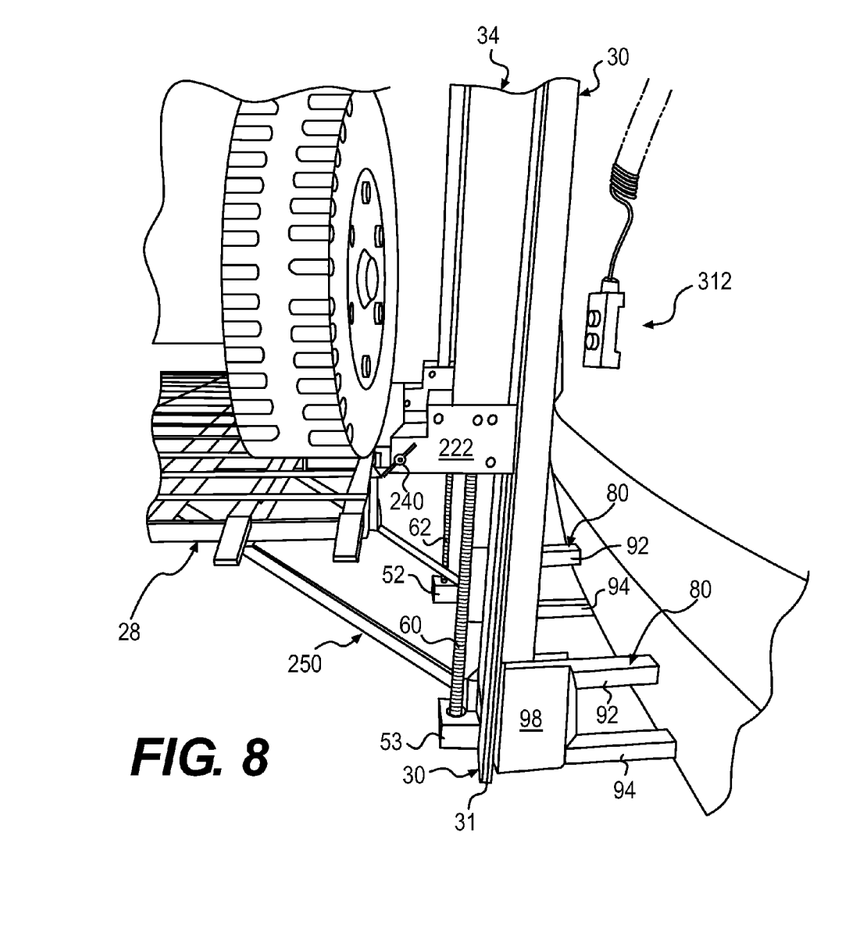
FIG. 8 partial side view showing the lifting apparatus in a raised condition.

The lifting mechanism 20 can be mounted on the mounting assembly 80 by first attaching the bars 86/88, of each of two spaced apart mounting assemblies 80 as is shown in FIG. 8, to the vehicle's frame or undercarriage. Then, the rear portions of support members 92/94 can be inserted into the hollow interior 90 of bars 86/88, respectively, and then pinned in place. With the vertical mounting bar 96 lying outwardly of the vehicle, as shown in FIG. 8, the hollow portion 33 of the bottom end of each of the two back rails 30/32 can be slid over and down onto the upper portion of the vertical mounting bars 96 thereby mounting the hauler assembly lifting mechanism 20 in place.

Turning now to FIGS. 5a-7 it can be seen that deck 28 can be supported, for example, by a pair of spaced apart deck rails 202 with each being pivotally connected to the lifting assembly 20, and specifically at the bottom end of each carriage 34/36, by a hinge structure 200. Since both hinge assemblies 200 are the same only one will be described in detail.

Figure 5A:
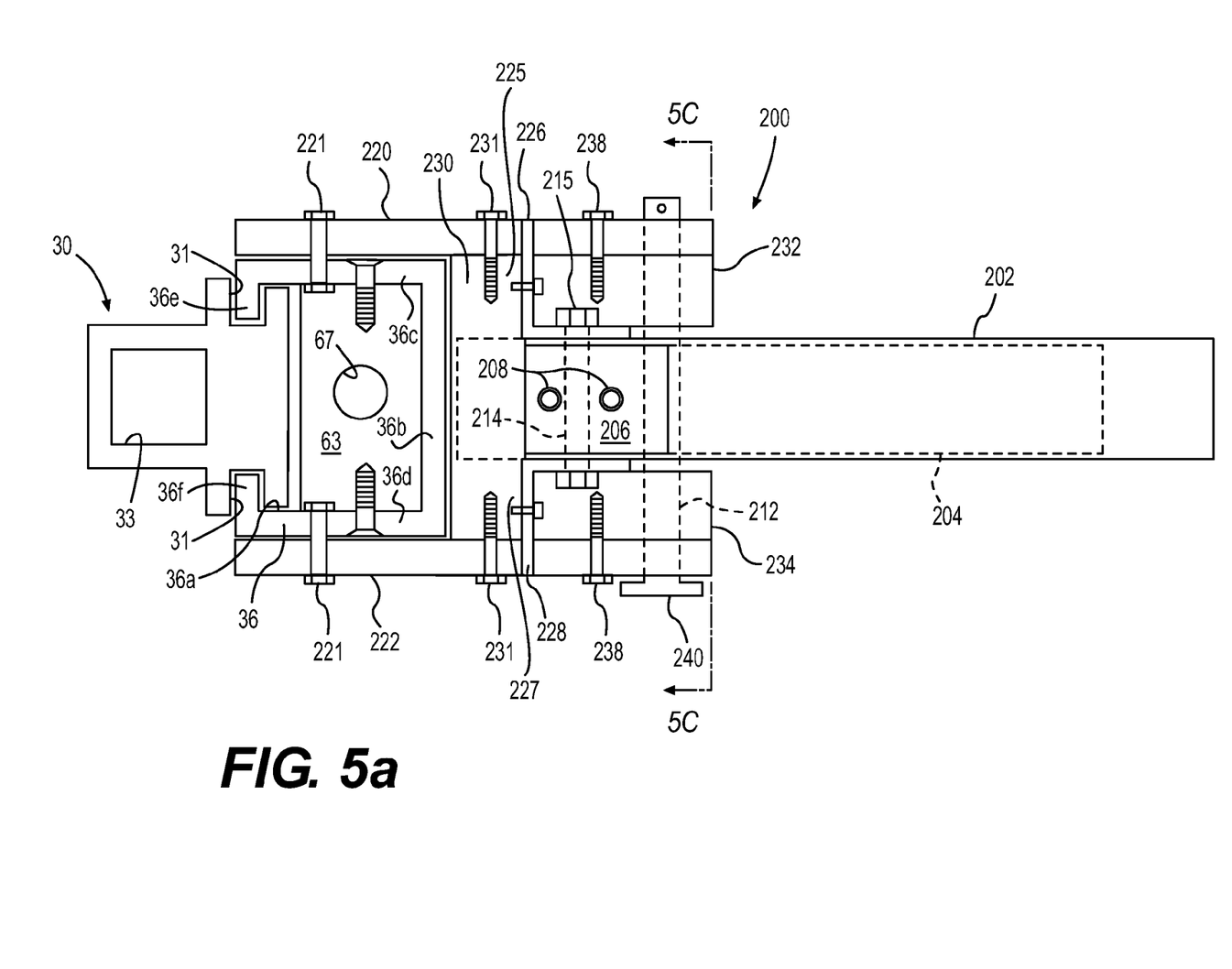
FIG. 5A is a partial cross-sectional and top plan view of the hinge structure.

In FIG. 5a back rail 30 is shown as having carriage 36 slidingly attached thereto by flanges 35 that fit and move within grooves 31 provided in the opposing sides of back rail 30. Hinge assembly 200 includes a pair of side members 220 and 222 that are each connected to carriage 36 by bolts or screws 221, for example. A stop block 230 is mounted between side members 220/222, for example, by screws 231, and stop block 230 spans across the inside width between side members 220/222. Mounted to the front of stop block 230 is a pair of L-shaped brackets 226 and 228 that are each attached by screws 225 and 227, respectively. Brackets 226/228 also include an aperture 229 that will receive and support a pin or bolt 215 that will pass through the apertures 229 and also through aperture 214 provided in a support block 206 that is separately secured to the top rear of deck rail 202 by bolts 208, as shown in FIG. 6.

Figure 5B:
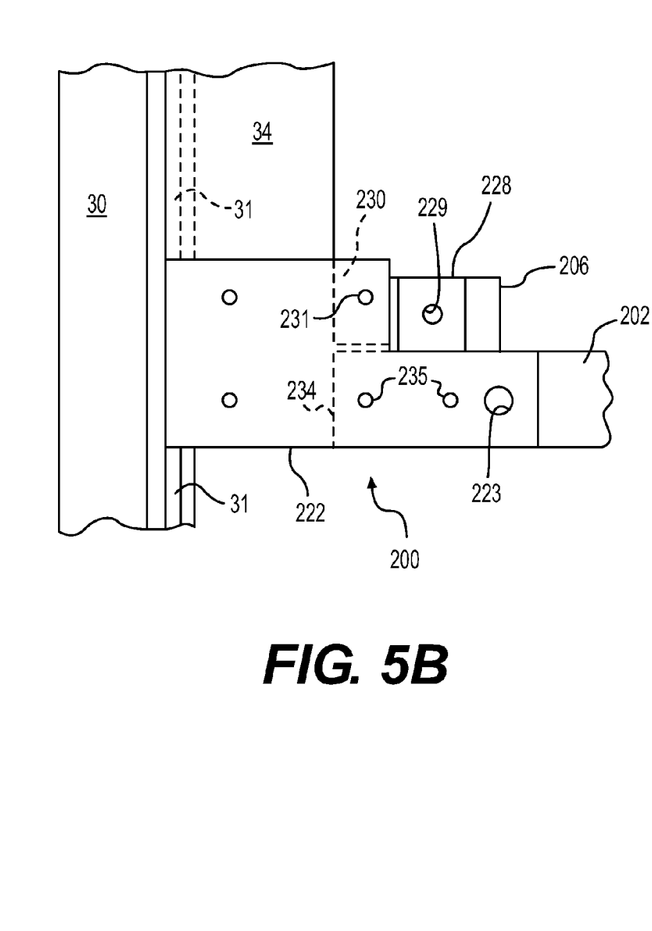
FIG. 5B is a side elevational view of the hinge assembly.
Figure 5C:
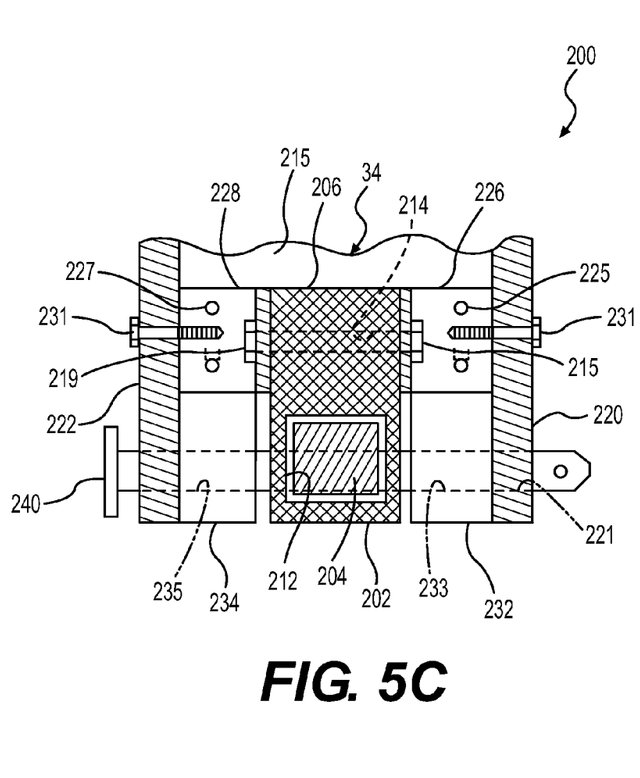
FIG. 5C is a cross-sectional view taken along line 5C-5C in FIG. 5A.

Two other blocks 232 and 234 are mounted below the L-shaped brackets 226/228 and extend from the front end of side members 220/222 back to and under stop block 230. Bolts or screws 235 can attach blocks 232/234 to side members 220/222, for example. An aperture 212 is provided in deck rail 202, and a pair of apertures 221 and 223 are formed in side members 220/222, respectively, along with apertures 233 and 235 in blocks 232/234, respectively, each will be aligned when deck rail 202 is in its lowered position, as shown in FIGS. 5a-5c. Consequently, when these apertures are in alignment a locking pin 240 can be inserted through apertures 223-235-212-233 and 221 to effectively lock deck rail 202 in that lowered position within hinge 200.

Figure 6:
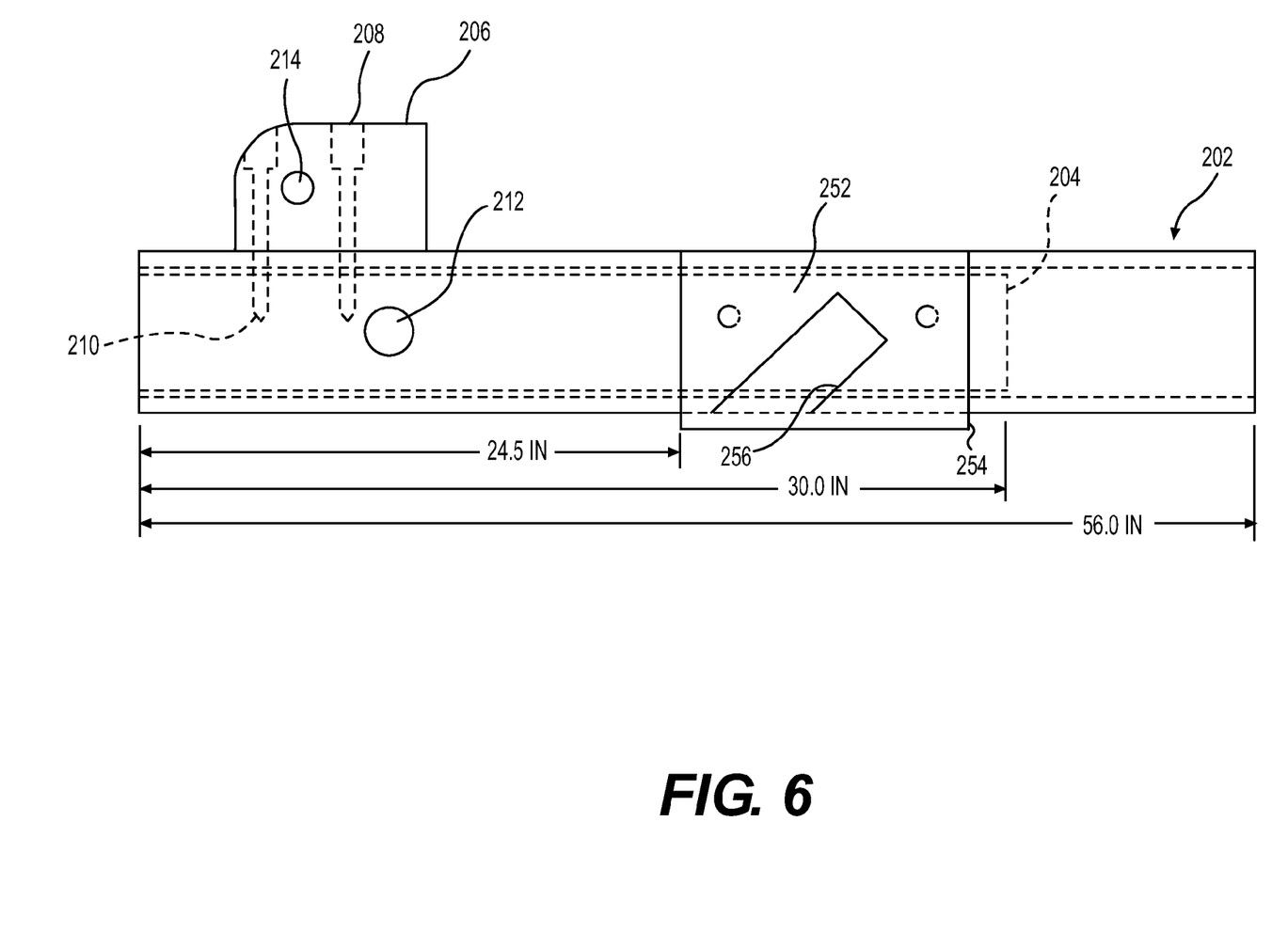
FIG. 6 is a side view of the deck rail.

As shown in FIG. 6 deck rail 202 preferably includes a solid insert member 204 that extends about 30 inches from the rear thereof toward the front end. Deck rail 202 is preferably about 56 inches long and can be formed as an extruded tube formed from metal, for example aluminum (such as 6061T), with the top being about 2.5 inches wide and having a side wall height also of about 2.5 inches. It is also preferable that aperture 212 be about 4 inches from the rear end of deck rail 202 and that block 206 be about 2 inches high.

Figures 7A, 7B:
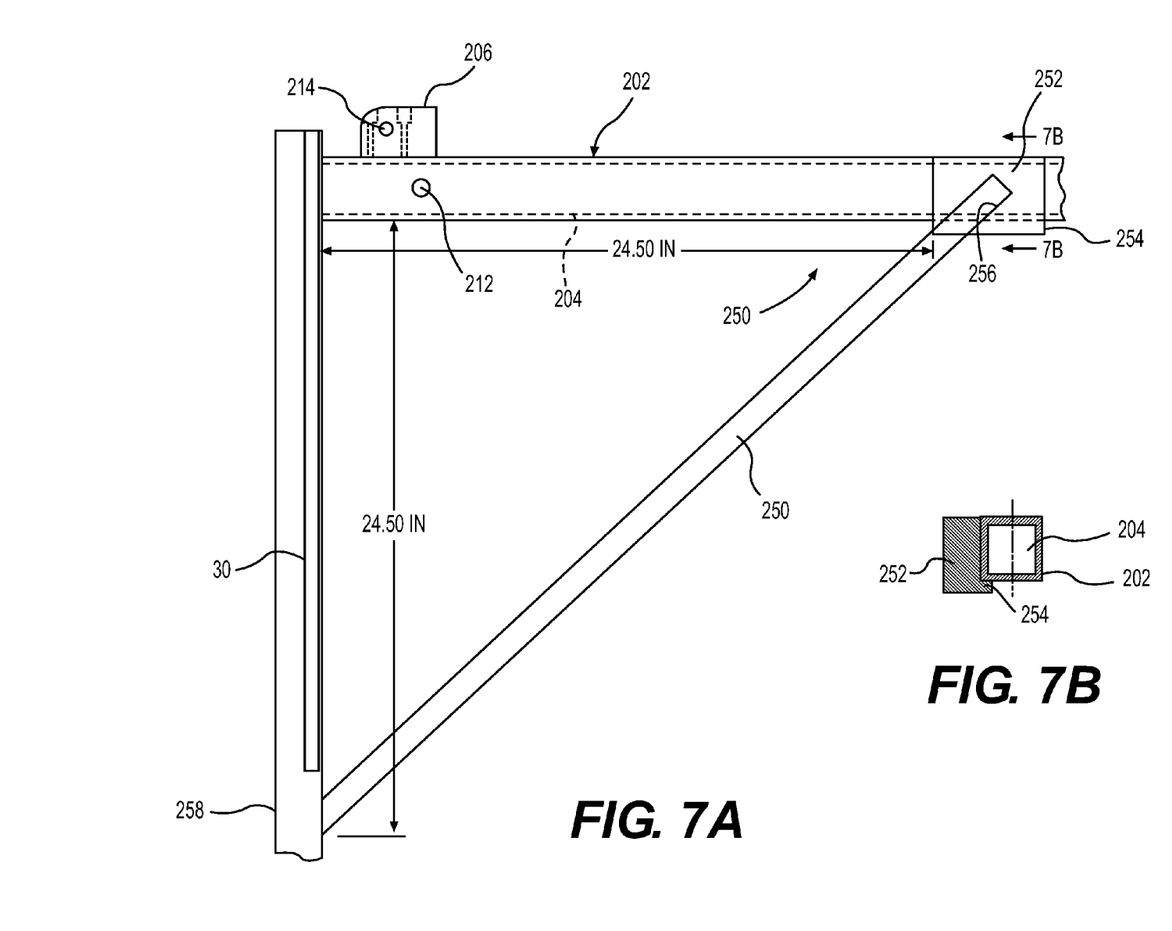
FIG. 7A is a side view of the raised deck support structure.
FIG. 7B is a cross-sectional view taken along line 7B-7B in FIG. 7A.

To securely lock deck 28 in place, once a load has been lifted into a transport position, a locking rod 250, shown in FIG. 7, is inserted between a seat 258, provided at a bottom end of each back rail 30/32, and a safety block 252 secured to deck rail 202 at a point about 24-26 inches forwardly from the rear thereof. Safety block 252 includes a projection or lip 254 on a bottom rear side, that will hook under deck rail 202, as is shown in FIG. 7a, and that lip 254 will bear the major portion of the forces being developed on rod 250 by the weight of a load supported by deck 28. The end of rod 250 can also be received within an angled groove 256 that is formed in the side of block 252 at an angle of about 52° from vertical, with a length of about 3.5 inches and a width of about 1 inch. Safety block 252 itself can be a solid block formed or machined from metal, for example aluminum and dimensionally can be about 3 inches high and 1.5 inches wide. Lip 254 preferably extends about a half inch from the rear surface, having about a half inch of thickness or height. To insert rod 250, deck 28 can be over raised, rod 250 can then be inserted into seat 258 at the bottom of back rails 30/32 and within the start of slot 256 in safety block 252, and the deck 28 can then be lowered enough to place weight on rod 250 between seat 258 and slot 256, and thereby lock deck 28 in its transport position.

FIG. 8 shows a partial side view of the lifting assembly 20 with deck 28 in its transport position and with locking rod 250 in place, and a load on deck 28. This also shows the two mounting assemblies 80, the back rails 30/32 on mounting assemblies 80, and the side of hinge assembly 200.

Figure 9:
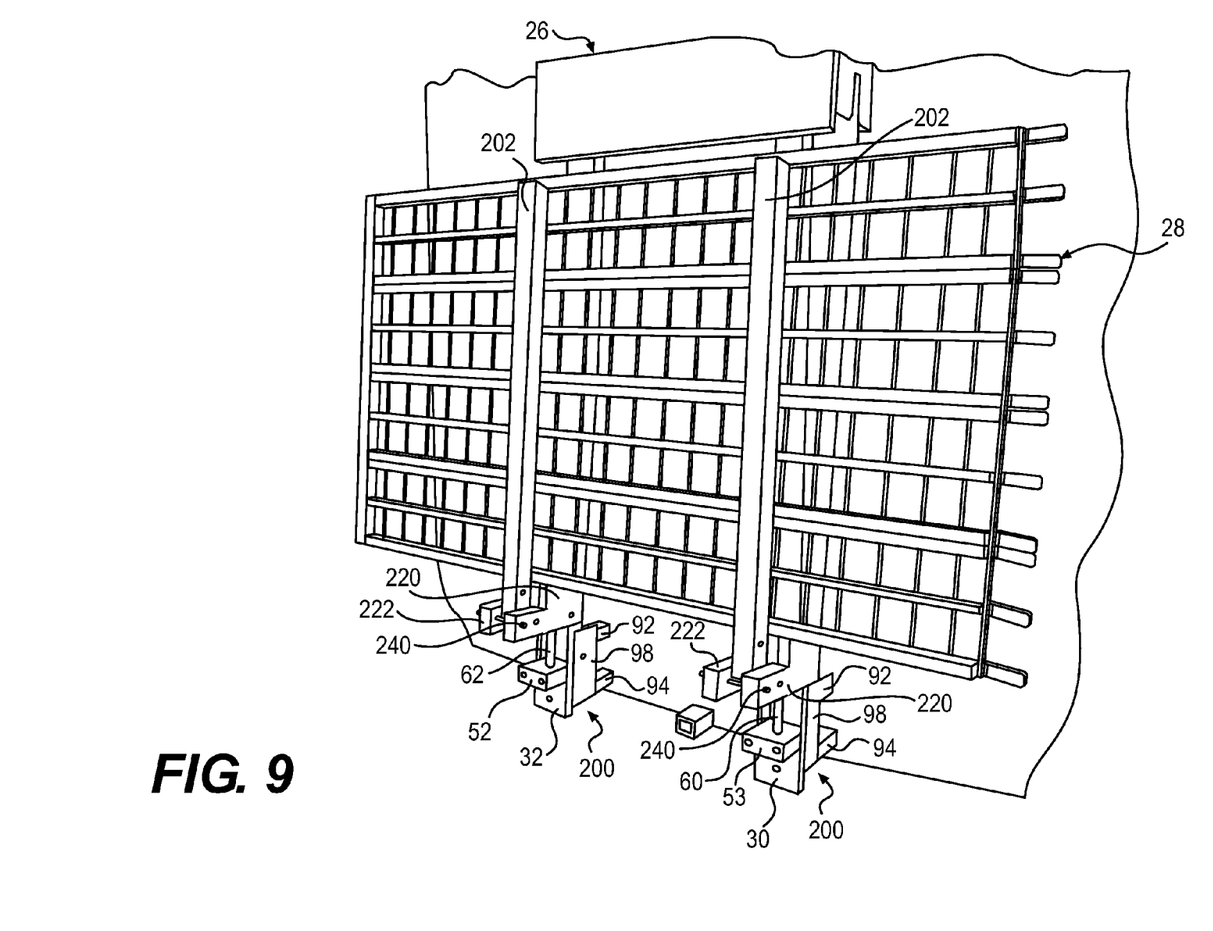
FIG. 9 is a perspective view showing the lifting mechanism of FIG. 1 in a lowered position and with the deck in a raised storage position.
Figure 10:
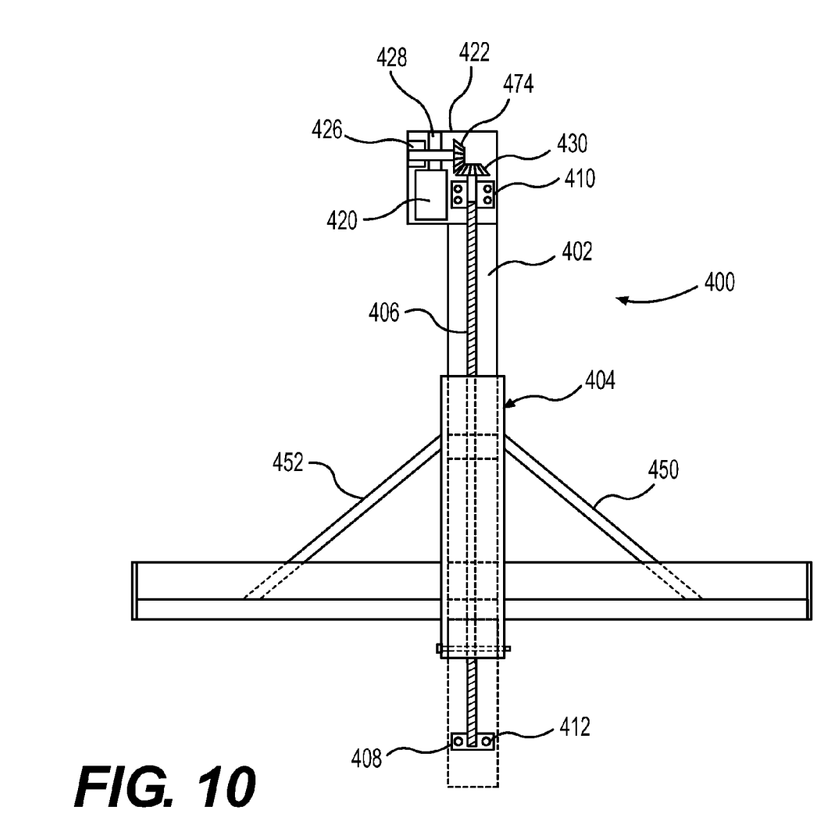
FIG. 10 is a front elevational view of another embodiment.
Figure 11:
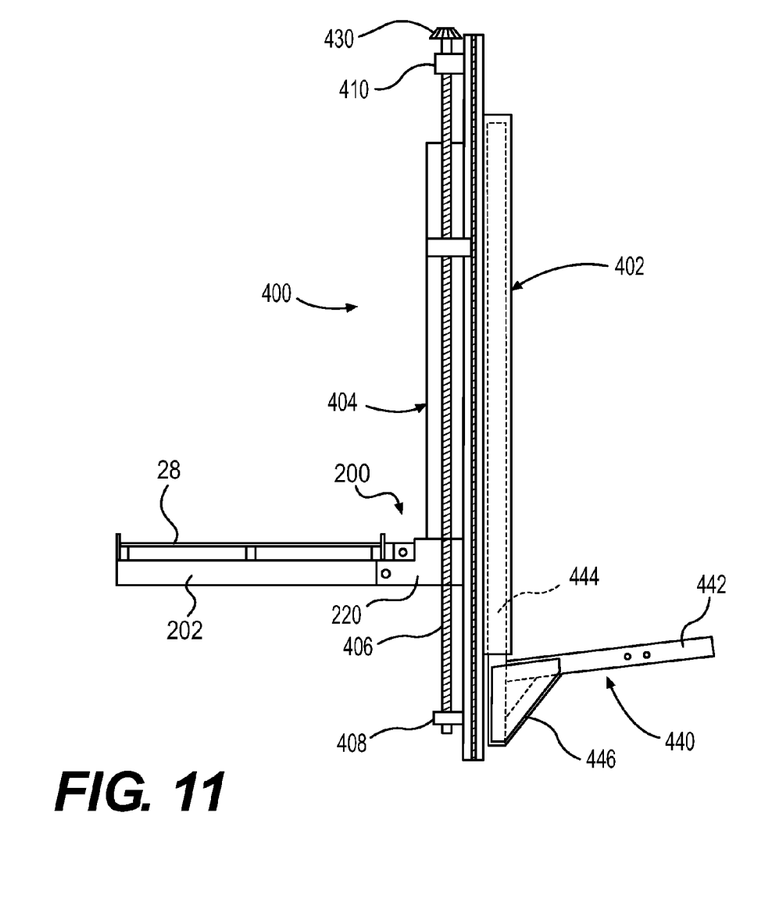
FIG. 11 is a side view of the embodiment shown in FIG. 10.
Figure 12:
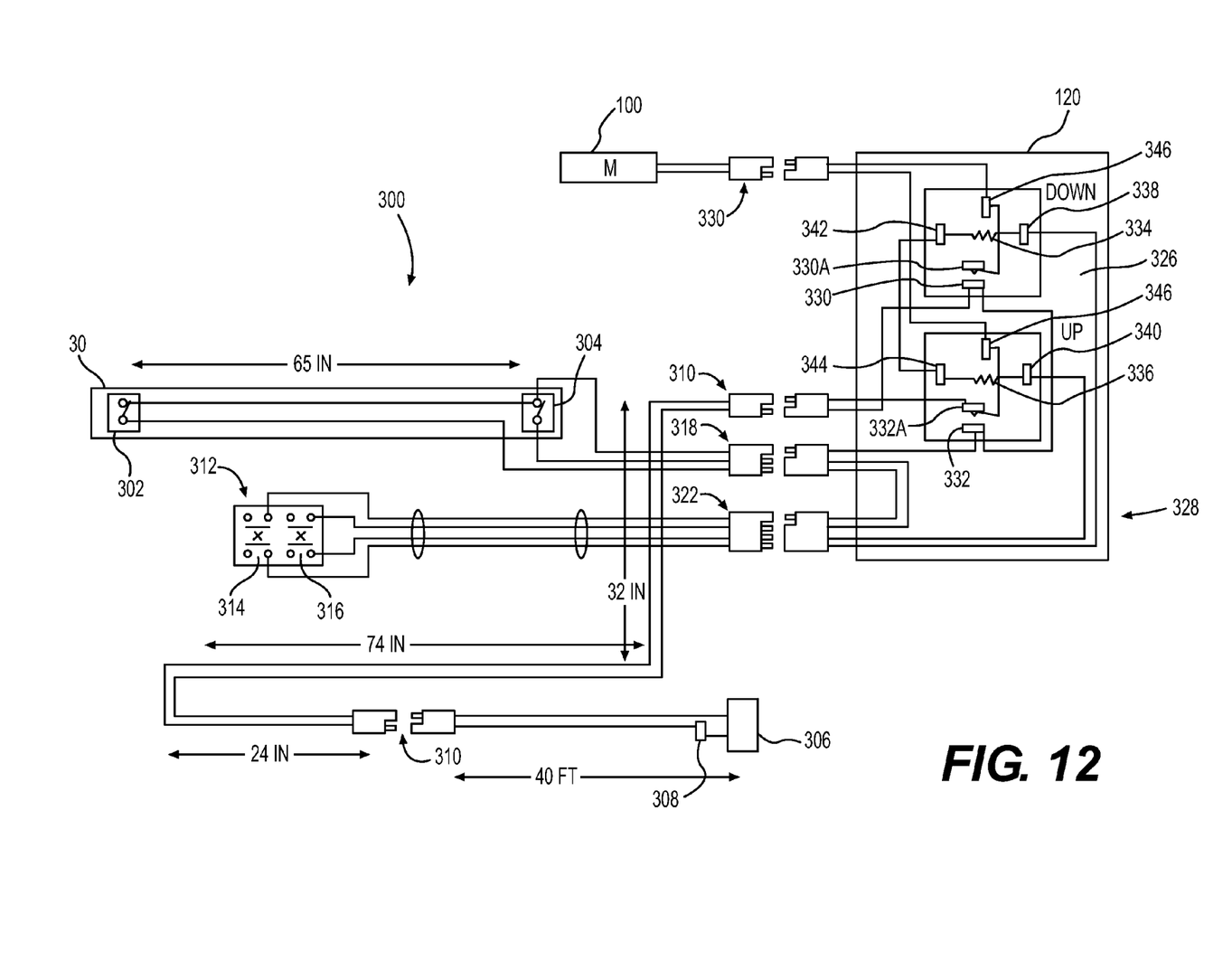
FIG. 12 is an electrical control circuit for the hauler apparatus of FIG. 1.

FIG. 9 shows the lifting assembly 20 with deck 28 in a folded position and with the lifting assembly 20 is in a lowered position so that hinge assemblies 200 lie adjacent the bottom of each of the back rails 30/32. The locking pin 240, once removed to permit deck 28 to be pivoted into a folded or stored position, can once again be inserted through its apertures 223-235-212-233 and 221 to lock deck 28 and deck rails 202 in the folded or stored vertical position. The upper port of deck 28 can also be secured in that folded or stored position by a drop latch, by suitable clamps, or by inserting locking bolt 240 into aperture 212. FIGS. 10 and 11 show a second embodiment of the present invention, and illustrate an approach using a single vertical support for the deck and yet provide a stable lifting structure for a wide variety of potential loads.

FIG. 10 shows a lifting assembly 400 that includes a back rail 402 on which a carriage 404 is movably mounted in a manner like that described above for carriages 34/36 on back rails 30/32 A single threaded rod 406 is rotatably mounted on back rail 402 by a bottom block 408 and a top block 410 with blocks 408/410 being mounted to back rail 402 by bolts 412 or a similar approach as noted previously.

Carriage 404 can comprise a structure like that described above for carriages 34/36 and will also slide in a pair of slots like those shown at 31 on opposing sides of back rail 30. Carriage 404 will also include two blocks 414 and 416 and each will have, like block 63, a threaded inner aperture 418 that will operatively mate with the threaded rod 406 so that as rod 406 is rotated by motor 420 carriage 404 will traverse up and down back rail 402, again depending upon the rotational direction of rod 406.

Motor 420 is mounted on an upper panel 422, at the top end of back rail 402, that likewise supports a drive shaft 428 connected to motor 420 that is rotatably mounted by a block 426 in a manner that permits it to be held and yet driven by motor 420. A bevel gear 424 is secured at an outer end of shaft 428, for example, by a set screw and gear 424 will be driven by shaft 428. Rod 406 also has a bevel gear 430 connected at the top thereof so as to operatively connect with and be driven by gear 424. Thus, as motor 420 rotates drive shaft 428, gear 424 will be driven in either a clockwise or a counter clockwise direction, thereby driving gear 430 and, in turn, rod 406 as well, which moves carriage 404 in a desired direction, up or down, along back rail 402.

FIG. 11 shows a side view of the single lifting structure and the vehicle mounting system 440 that includes a rearward extension member 442, a vertical member 444, that will slide onto the back rail 402 in a manner similar to that shown between member 96 and the open interior 33 of back rail 30. A supporting side plate 446 is also shown in FIG. 11 that can be attached, for example, by being welded, to both members 442 and 444 to provide extra support to the mounting system 440. This mounting system 440 will itself be mounted in a support like that shown at 82 which will be securely attached to the vehicle's frame. In addition, a hinge assembly as a 200 can be used here as well along with the deck rail 202.

The control circuit 300 for lifting assembly 20 is shown in FIG. 10 and comprises a set of limit switches 302 and 304 placed on one of the back rails 30 and at spaced apart locations about 65 inches from one another adjacent opposing ends of the back rail 30. The vehicle battery 306 is connected to the circuit control box 320 via a breaker or fuse 308 of a suitable number of amps, for example 40 amps, and a suitable plug 310. A controller 312, for inputting up/down controls, includes a pair of push buttons 314 and 316, which can be, for example, a two button weather proof fully harnessed system Model 5911 AMT 12/24 volt system, and is connected to control box 320 via plug 322. Plug 218 connects the limit switches 302/304 to control box 320 and a plug 324 connects control box 320 to motor 100.

Control box 320 itself includes two relay circuits comprising a down relay circuit 326 and an up relay circuit 328. Each includes a normally open switch 330 and 332, a resistor 334 and 336, a relay coil 338 and 340, a relay coil 342 and 344, and terminating terminals are shown at both 346 and 348.

D. Operation

In operation, the vehicle connection portion 82 will be attached and secured onto the vehicle frame and once the lifting mechanism connection assembly 84 is secured to the vehicle connection portion 82 the lifting assembly 20 can be mounted in place.

Once the lifting assembly is fully operational, the circuit is powered and motor 100 is working, deck 28 can be mounted to deck rails 202. Then, with deck 28 in a lowered position a load, such as a golf cart, a boat, packaged gear or other items can be secured in place on deck 28 and thereafter deck 28 can be raised and secured in a desired transport height. Once the vehicle arrives at the end of a trip, when the load is to be removed, the process will be followed in the reverse after the load has been removed, unless further loads will be transported in which case deck 28 can be stored in a folded condition until needed once again.

As an example, the load capacity of this lifting assembly can be about 2000 pounds, but the actual weight capacity depends upon the load rating of the materials being used. Thus, the load capacity could be both more and less than that example. Also, loads held on the deck can be secured or tied down by any number of conventional approaches, including, for example, but not limited to, straps, bands, chains, rope, clamps, and/or combinations of the above.

When introducing elements of various aspects of the present invention or embodiments thereof, the articles "a," "an," "the" and "said" are intended to mean that there are one or more of the elements, unless stated otherwise. The terms "comprising," "including" and "having," and their derivatives, are intended to be open-ended terms that specify the presence of the stated features, elements, components, groups, and/or steps, but do not exclude the presence of other unstated features, elements, components, groups, and/or steps and mean that there may be additional features, elements, components, groups, and/or steps other than those listed. Moreover, the use of "top" and "bottom," "front" and "rear," "above," and "below" and variations thereof and other terms of orientation are made for convenience, but does not require any particular orientation of the components. The terms of degree such as "substantially," "about" and "approximate," and any derivatives, as used herein mean a reasonable amount of deviation of the modified term such that the end result is not significantly changed. For example, these terms can be construed as including a deviation of at least +/−5% of the modified term if this deviation would not negate the meaning of the word it modifies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hauling assembly comprising
an elongated, vertically extending frame including a pair of rail members having a front portion and a rear portion, the front portion having opposing side surfaces each including a vertically and inwardly extending groove, the rear portion having a hollow interior portion extending upwardly from a bottom thereof for at least a predetermined distance, each rail member being provided with its own drive mechanism, and an upper section interconnecting an upper portion of each of the rail members and each drive mechanism;
a pair of carriages each having an elongated, hollow interior defined by front wall interconnected with spaced apart side walls, each side wall having a rear edge formed with an inwardly directed flange that define an open gap there between, and being movably mounted to the frame such that the inwardly directed flanges of each respective side wall slidingly engage one of the inwardly extending grooves in the opposing side surfaces of one of the pair of rail members so that the front portion of each of the pair or rail members fits within the gap;
a drive system including a drive mechanism mounted to the frame and to each of the pair of carriages to move the carriages along the frame between lowered and raised positions, the drive mechanism including a drive rod rotatably mounted onto the frame and operatively engaged within a block member retained by each of the pair of carriages, and a drive motor mounted on the upper section, and wherein the drive system further includes a pair of rotatably mounted drive rods, one for each of the carriages, a drive member rotationally mounted to the upper section and operatively connected between the drive motor and each of the rotatably mounted drive rods to rotate the pair of drive rods together;
a deck operatively attached to the carriage to support a load and so as to be pivotally movable between a lowered transport and a raised stored position; and
further including a vehicle mounting assembly having a rear vehicle attaching portion and a front mounting portion including a pair of spaced apart upwardly extending mounting post assemblies over which the hollow interior of each of the pair of rail members will be slidingly received.

2. The hauling assembly as in claim 1 wherein the block member is mounted internally of each of the carriages at a fixed point located between the sidewalls and forwardly of the rail members.

3. The hauling assembly as in claim 1 wherein the deck is pivotally attached to the pair of carriages by a hinge assembly including at least one support wall having a rear portion mounted to a side wall of the carriage, a stop member secured to a front portion of the at least one support wall, a deck rail pivotally mounted to the hinge assembly so as to be pivotal between raised and lowered positions, and a locking member locking the deck rail to the hinge assembly in each of the lowered and raised positions.

4. The hauling assembly as in claim 1 further including a control system for controlling operation of the drive system.

5. The hauling assembly as in claim 1 wherein the deck includes at least one support rail pivotally attached to each of the carriages and a deck member secured to the support rails.

6. The hauling assembly as in claim 3 wherein the hinge assembly further includes a pair of opposing support walls mounted to opposite sides of the carriage, the stop block being positioned between the pair of support walls and against a front wall of the carriage, and a pair of spacer blocks each being mounted to one of the pair of support walls and spaced apart to permit the deck rail to pivot there between.

7. The hauling assembly as in claim 1 wherein each of the pair of upwardly extending mounting posts is angled rearwardly away from vertical and is positioned at an acute angle relative to the plane of the rear vehicle attaching portion.

8. The hauling assembly as in claim 7 wherein the rearward angle is about 6° from vertical.

9. The hauling assembly as in claim 1 further including a deck support member pivotally attached to each of the pair of carriages by a hinge assembly, each deck support member comprising an elongated, hollow member having an elongated insert positioned within the hollow interior that extends for a predetermined distance from the hinge assembly toward an outer end of each deck support member.

10. The hauling assembly as in claim 9 further including a locking member removably positioned between a seat provided on a lower portion of each of the pair rail members and a seat provided on each deck support member at a point spaced inwardly from the outer end thereof.

11. The hauling assembly as in claim 10 wherein the seat at the outer end of each deck support member is formed in a block member secured to each deck support member, said block member including a lip that extends along and beneath the deck support member.

12. The hauling assembly as in claim 9 wherein the hinge assembly includes a pair of spaced apart side members, a pair of spacer blocks between which each deck support member moves, a stop block positioned rearwardly of the spacer blocks and spanning between and secured to the side members at a location to intercept a rear portion of the deck support member, and a deck support locking device for locking each deck support member in each of a lowered and raised position.

13. The hauling assembly as in claim 12 further including a pivot block extending upwardly from a top surface of the deck support member to operatively engage with the hinge assembly forwardly of the stop block.

14. A hauling assembly comprising
an elongated, vertically extending frame including a pair of spaced apart supports, each having a front portion and a rear portion, the front portion having opposing side surfaces each including a vertically and inwardly extending groove, the rear portion having a hollow interior portion extending upwardly from a bottom thereof for at least a predetermined distance;
a pair of carriages, each being movably mounted to one of the pair of spaced apart supports, each carriage having an elongated, hollow interior defined by front wall interconnected with spaced apart side walls, each side wall having a rear edge formed with an inwardly directed flange that define an open gap there between, and being movably mounted to the frame such that the inwardly directed flanges of each respective side wall slidingly engage one of the inwardly extending grooves in the opposing side surfaces of the at least one rail member so that the front portion of the at least one rail member traverses within the gap;
a drive system including a drive mechanism mounted to the frame and the carriages to move each of the carriages along the frame between lowered and raised positions the drive mechanism including a drive rod rotatably mounted onto the frame and operatively engaged within a block member retained by the carriage;
a deck operatively attached to the carriage to support a load and so as to be pivotally movable between a lowered transport and a raised stored position; and
further including a vehicle mounting assembly having a rear vehicle attaching portion and a front mounting portion including at least one upwardly extending mounting post assembly over which the at least one rail member hollow interior will be slidingly received, further including a pair of support rails, each being pivotally connected to one of the pair of carriages, and wherein the drive system includes a pair of rods one being rotationally mounted to each of the pair of spaced apart supports and engaged with one of the carriages, the drive system including a drive motor and an operative connection between the drive motor and each of the drive rods so that each carriage can be moved by the simultaneous rotation of the drive rods in either one of a clockwise or counter clockwise direction.

15. The hauling assembly as in claim 14 further including a deck member secured to the pair of spaced apart support rails.

16. The hauling assembly as in claim 15 further including a control system for controlling operation of the drive system and the movement of the pair of carriages.

17. A lifting assembly for use with a vehicle in transporting a load comprising:
a pair of spaced apart, vertically extending support members and an upper support extending between and connected to an upper end of each of the pair of support members, the support members each having a front portion and a rear portion, the front portion having opposing side surfaces each including a vertically and inwardly extending groove, the rear portion having a hollow interior portion extending upwardly from a bottom thereof for at least a predetermined distance;
a carriage movably mounted on each of the pair of support members and having an elongated, hollow interior defined by a front wall interconnected with spaced apart side walls, each side wall having a rear edge formed with an inwardly directed flange that define an open gap there between, and being movably mounted to the support members such that the inwardly directed flanges of each respective side wall slidingly engage one of the inwardly extending grooves in the opposing side surfaces of the support members so that the front portion of the support members traverses within the gap;
a vehicle mounting assembly having two spaced apart vehicle connection portions each being secured to a frame of a vehicle and each including a front mounting portion having an upwardly extending mounting post assembly over which the hollow interior of the support members will be slidingly received and wherein the upwardly extending mounting posts are angled rearwardly away from vertical and are positioned at an acute angle relative to the plane of the rear vehicle connection portion;
each of the front mounting portions being removably connected to the vehicle connection portions;
a drive system to move the carriages vertically along the pair of support members;
a deck pivotally attached to each of the carriages so as to be movable between transport and storage positions; and
a control system by which the lifting assembly operation is controlled.

18. The hauling assembly as in claim 17 wherein the rearward angle is about 6° from vertical.

* * * * *